UNITED STATES PATENT

[19] United States Patent
Mases et al.

[11] Patent Number: 4,460,014
[45] Date of Patent: Jul. 17, 1984

[54] NON-MIXING VALVE

[75] Inventors: Per E. Mases; Gunnar Lundquist, both of Malmö; Harry Nyqvist, Tullinge; Torsten Carlsson, Södertälje, all of Sweden

[73] Assignee: Alfa-Laval AB, Tumba, Sweden

[21] Appl. No.: 255,962

[22] Filed: Apr. 20, 1981

[30] Foreign Application Priority Data

Apr. 24, 1980 [SE] Sweden ................................ 8003130

[51] Int. Cl.³ ........................ F16K 11/20; F16K 51/00
[52] U.S. Cl. ............................ 137/614.18; 137/614.19; 137/240; 137/312; 251/210; 251/DIG. 1
[58] Field of Search ................... 251/210, 63, DIG. 1; 137/312, 614.11, 614.18, 614.19, 240

[56] References Cited

U.S. PATENT DOCUMENTS

| 2,720,219 | 10/1955 | Grove et al. | 251/210 |
| 2,970,806 | 2/1961 | Rexford et al. | 251/210 |
| 2,984,450 | 5/1961 | Doe | 251/282 |
| 4,094,334 | 6/1978 | Taylor | 251/282 |
| 4,271,860 | 6/1981 | Jeppsson | 251/DIG. 1 |
| 4,304,251 | 12/1981 | Schädel et al. | 137/614.19 |

FOREIGN PATENT DOCUMENTS

| 2623301 | 12/1977 | Fed. Rep. of Germany | 137/240 |
| 2064724 | 6/1981 | United Kingdom | 137/312 |
| 777703 | 11/1980 | U.S.S.R. | 137/312 |

Primary Examiner—A. Michael Chambers
Attorney, Agent, or Firm—Townsend and Townsend

[57] ABSTRACT

The disclosure relates to a non-mixing valve intended for sealing between two conduits and comprising two mutually movable valve bodies which are disposed to realize a double seal against the seats located in an opening between the conduits. A leakage chamber is disposed between the two valve bodies for draining-off leakage between the conduits. The seal on the one valve body consists of an axial seal, and the seal on the other valve body cosists of a radial seal. Furthermore, the valve bodies, of which the one is disposed to accommodate the end of the other, are of such configuration as to balance pressure and pressure hammers in the conduits.

17 Claims, 3 Drawing Figures

NON-MIXING VALVE

The present invention relates to a non-mixing valve intended for sealing between two conduits and comprising two mutually movable valve bodies which are disposed each to cooperate with its seat in order to realize a double seal, a leakage chamber being disposed between the two valve bodies for draining off leakage between the two conduits.

In certain processes, primarily within the brewery and dairy industries, there is a need to be able to separate two conduits containing different products in a reliable manner such as to prevent intermixing of the products. This problem is solved by means of a double seal in which the interjacent space is drained-off. At the present time, it is normal in the art to solve this problem by means of two separate valves.

The double seal with an interjacent drainage space may also be realized in a single valve, which simplifies the system installation in the processes involved. Consequently, one object of the present invention is to realize a valve which solves the above-mentioned problem and which, moreover, is simple and reliable in its function and construction.

This object is achieved in that the seal of the one valve body consists of an axial seal disposed at the end of the body, and the seal of the other valve body consists of a radial seal disposed at the end of the body; and in that the configuration of the valve bodies is such that forces acting upon the valve bodies and caused by pressure and pressure hammers in the conduits are balanced. Moreover, according to the invention, the axially sealing valve body has a recess on its side turned to face the radially sealing valve body, the recess being designed to receive, when the valve is opened, the end of the radially sealing valve body, and its radial seal.

The characteristics of preferred embodiments of the present invention will be apparent from the appended claims.

The present invention will be described in greater detail below with reference to the accompanying drawings which show one preferred embodiment of the present invention and in which:

FIGS. 1 and 2 illustrate a valve according to the invention. The right-hand half of FIG. 1 shows the valve in the closed position and the left-hand half shows the valve in the open position.

Figure 1:
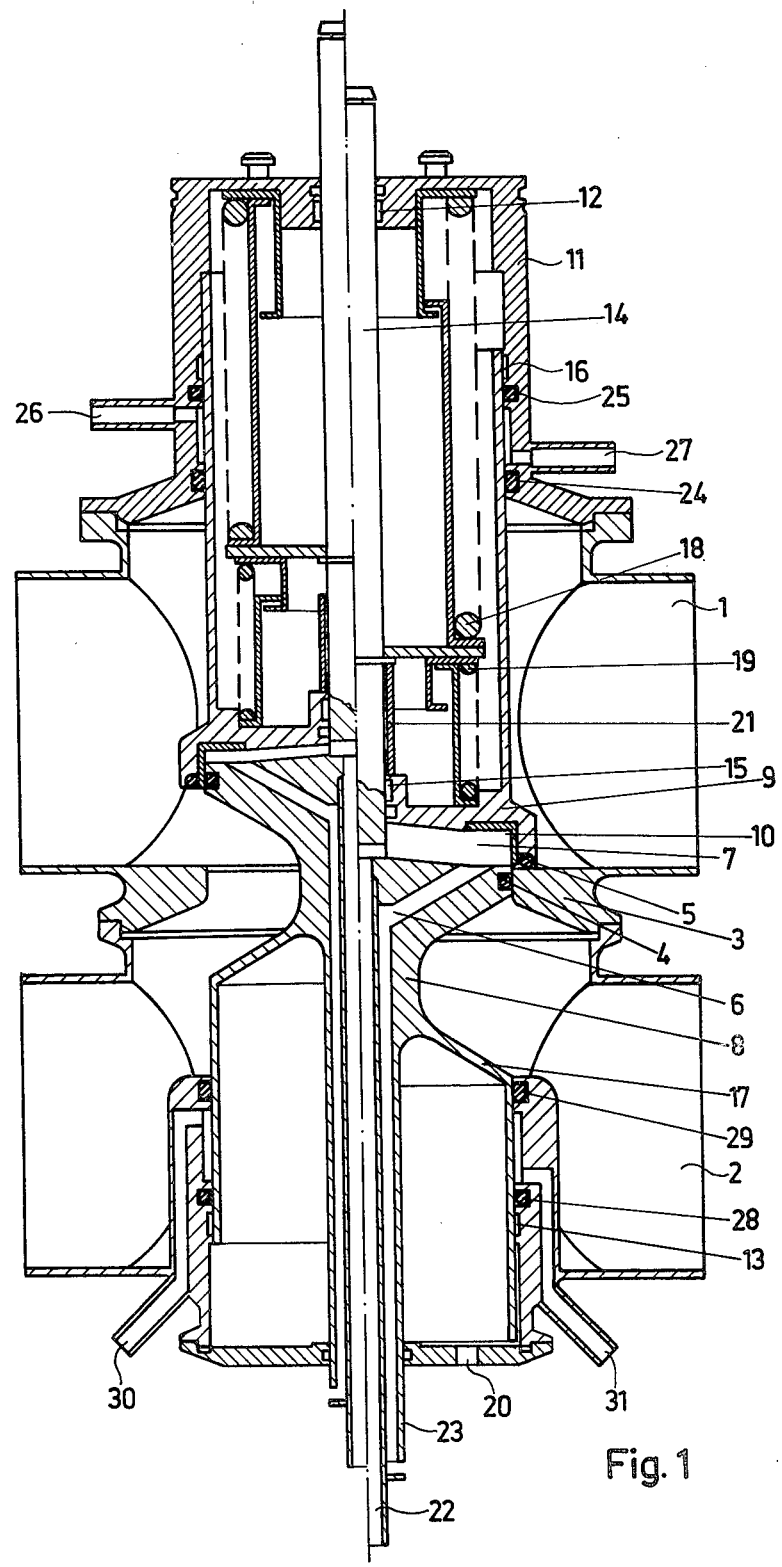
FIG. 1 is a longitudinal section through a valve according to the invention, the left-hand half of FIG. 1 showing the valve in the open position and the right-hand half showing the valve in the closed position.

A double seal between two product conduits 1 and 2 is realized with a valve seat 3 and, on the one hand, a radial seal 4, and, on the other hand, an axial seal 5.

Possible leakage past any of the seals is drained off through channels 6 from an interjacent space 7, whereby intermixing of the products in the conduits 1 and 2 will be prevented. The radial seal 4 is placed in a lower valve cone 8. The axial seal 5 is lodged in a cylindrical upper valve cone 9.

When the valve is opened, the lower valve cone 8 is operative to slide first upwardly and into a recess 10 in the upper valve cone 9, whereafter both of the cones together continue their upward movement until the valve is in the completely open position (the left-hand half of FIG. 1). When the valve is opened and closed, the radial seal is protected from wear in that the transition between the valve seat 3 and the recess 10 (which constitutes the enclosed, protective position for the radial seal at the upper valve cone) is effected at the same diameter and towards small bevelled edges, as is clearly illustrated in FIG. 2.

The lower valve cone 8 is movable with respect to the valve housing 11 of the valve and is guided by sliding rings 12 and 13 at the upper and lower end of the housing, respectively. The upper valve cone 9 is guided by the rod 14 of the lower valve cone in the slide ring 15 and against the valve housing 11 in the sliding ring 16.

The entire valve is, in principle, balanced against pressure and pressure hammers in the product conduits in the closed and opened positions in that the upper valve cone 9 is cylindrical and the lower valve cone 8 has a balancing piston 17 of the same diameter as the valve seat 3. However, the upper valve cone 9 is not fully balanced in the closed position in that the axial seal 5 seals against the upper face of the valve seat. Excess pressure in the upper product conduit then acts on the annular surface which is formed between the peripheries of the axial seal 5 and the cylindrical surface, and a further closing force is obtained.

The prime mover of the valve is an air motor which is built into the balancing piston 17 of the lower valve cone 8. Two springs 18 and 19 are built in to the cylinder of the upper valve cone 9. Since the spaces for balancing are utilized for the air motor, the entire valve will be low in construction height.

Consequently, the force balance on opening and closing of the valve will be as follows:

When the valve is opened, compressed air is led into the balancing piston 17 through the inlet 20. There, the opening force will be greater than the strength of the closing spring 18, the two cones being brought together. The lower, weaker, spring 19 acts in order to hold together the lower and upper valve cones. When these are brought together, the opening movement of the valve continues to the open position according to that shown in the left-hand half of FIG. 1.

When the air pressure ceases, the upper spring 18 forces the two united cones downwardly in the direction towards the valve seat 3 where the upper cone comes to rest and the lower continues to its closure position. The spring 18 then acts on the axial seal 5 in that the closing force is transferred to the upper valve cone by the intermediary of the sleeve 21.

Figure 3:
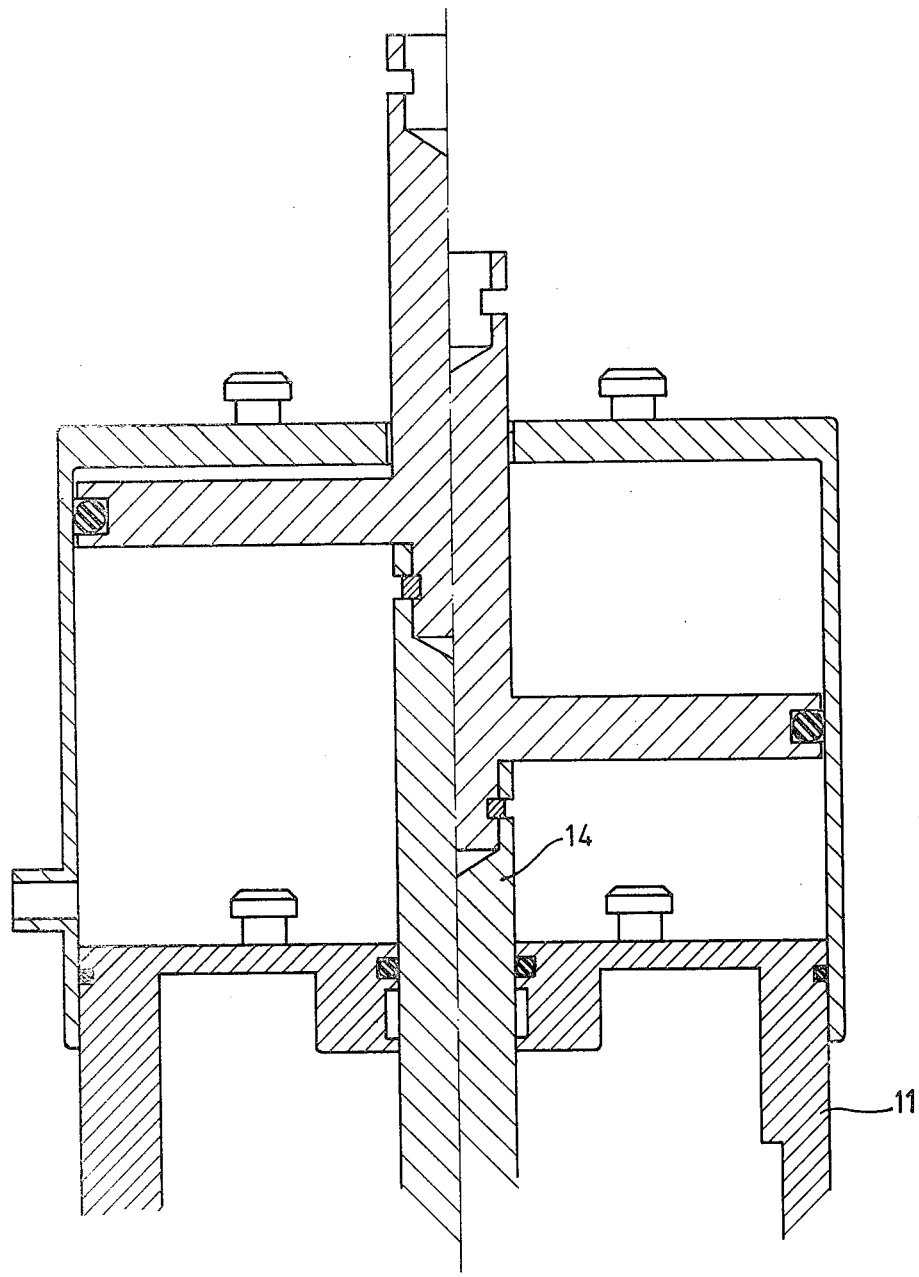
FIG. 3 is a cross-section through a pneumatic motor which is coupled to the upper end of the valve which is here shown in part.

In the event that the available air pressure is low, an extra air motor may be placed above the valve, as shown in FIG. 3. In such an instance, the air pressure is supplied in parallel to both the air motors, the requisite actuating force being obtained.

Washing of the leakage space 7 and those surfaces which, in some phase of the operation of the valve, are in contact with the products in the conduits, is carried out as follows:

Three spaces need to be washed, these operations being carried out in parallel. The leakage space 7 is supplied with washing liquid through the inlet 22. Discharge takes place in the larger concentric tube 23 to which the channels 6 lead. The stroke of the upper valve cone is washed between the seals 24 and 25, the inlet being located at 26 and the outlet at 27. The stroke of the lower valve cone is washed in a similar manner to the upper cone, but between the seals 28 and 29, the inlet being located at 30 and the outlet at 31.

Figure 2:
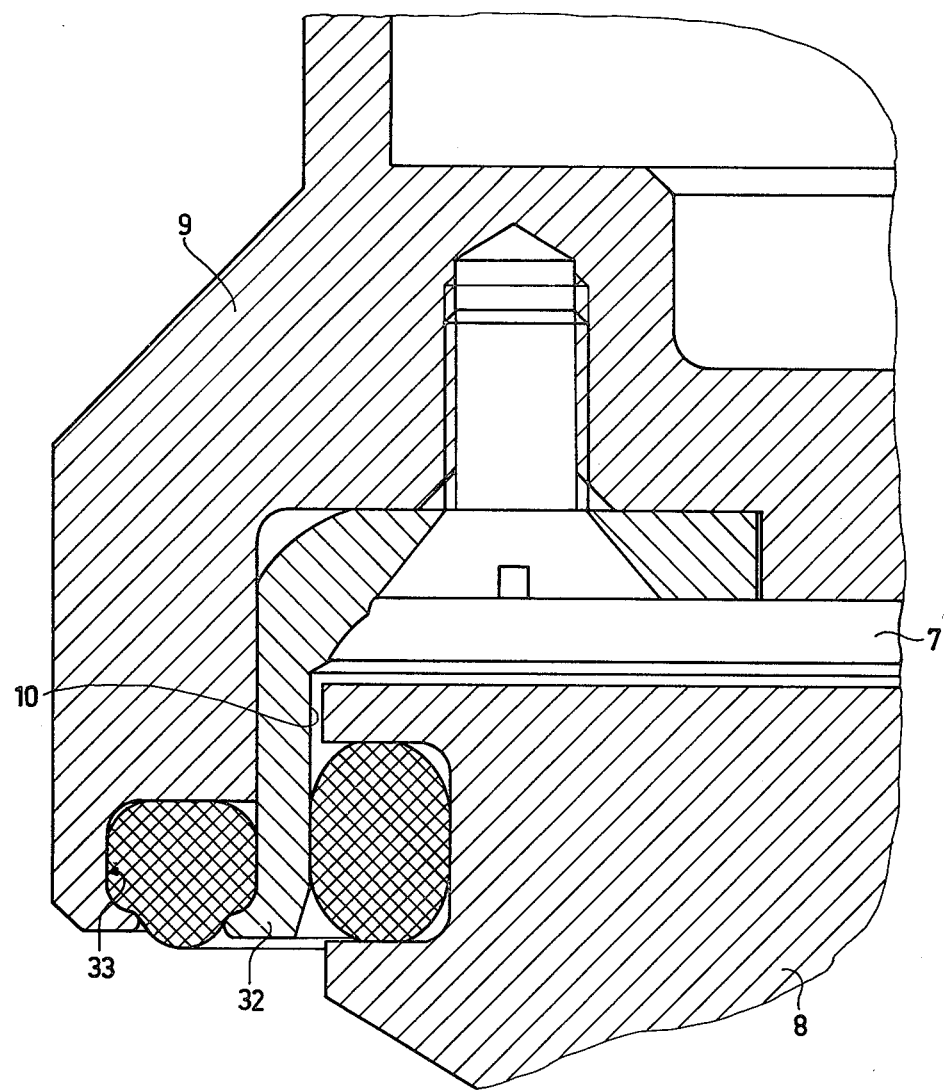
FIG. 2 is a magnified partial cross-section of one radial seal and one axial seal of the valve in the open position.

The mounting of the axial seal 5 is apparent from FIG. 2. A ring 32 is fixedly screwed into the upper valve cone 9 and forms a recess 33 with the upper valve cone, in which recess the axial seal is lodged.

Naturally, the present invention may be modified in a number of ways without departing from the spirit and scope of the appended claims.

We claim:

1. A double-seated valve, comprising:
   a valve housing having at least two conduit openings, a first valve seat and a second valve seat, first and second valve members each guided in the valve housing for movement relative to each other and the associated one of the first and second valve seats between an open position and a closed position,
   the first valve member being adapted for axially sealing in its closed position against the first valve seat,
   the second valve member being adapted to abut during its opening movement against the first valve member and to move the latter during further opening movement into its open position,
   a leak chamber defined between the valve members in both the closed and the open positions thereof, and a drain outlet permanently connecting the leak chamber to the outside of the valve,
   the second valve member including a sliding body having radially oriented sealing means adapted to be sealingly received in an internal cylindrical seat wall of the second valve seat,
   the first valve member having at its end proximate the second valve member an axial recess adapted to sealingly receive during opening of the valve a portion of the sliding body of the second valve member, and at least one of the valve members being shaped to substantially balance pressure forces and pressure hammers exerted thereon by the fluid.

2. A valve according to claim 1, wherein the second valve member includes a balancing piston sealingly guided in the valve housing and having a diameter substantially equal to the diameter of the second valve seat.

3. A valve according to claim 2, wherein the valve housing is provided with an annular washing space for cleaning the stroke length of a circumferential surface of the balancing piston, the washing space being disposed between annular seals and having an inlet and an outlet for washing liquid.

4. A valve according to claim 1, wherein the first valve member has a substantially cylindrical shape, and includes axial sealing means at its end surrounding the recess and, proximate its other end, a cylindrical wall sealingly guided in the valve housing, the cylindrical wall having a diameter slightly smaller than that of the axial sealing means.

5. A valve according to claim 4 further comprising an axial rod connected to the second valve member and sealingly extending through the first valve member, first spring means disposed within an internal space of the first valve member for permanently urging the second valve member into its closed position, and second spring means disposed within the internal space of the first valve member and adapted to urge same during the opening of the valve towards the second valve member.

6. A valve according to claim 5, wherein the second valve member includes a balancing piston defining a movable part of a pneumatic motor adapted to move the second valve member against the urging force of the first spring means into abutment with the first valve member and, thereafter, to move the first and second valve members into their open position.

7. A valve according to claim 6, further comprising an auxiliary pneumatic motor acting on the axial rod of the second valve member and adapted to urge the latter into its open position.

8. A valve according to claim 5, further comprising an auxiliary pneumatic motor acting on the axial rod of the second valve member and adapted to urge the latter into its open position.

9. A valve according to claim 5, wherein the axial rod of the second valve member is sealingly guided in an upper part of the valve housing.

10. A valve according to claim 4, wherein the valve housing is provided with an annular washing space for cleaning the stroke length of a circumferential surface of the cylindrical wall, the washing space being disposed between annular seals and having an inlet and an outlet for washing liquid.

11. A valve according to claim 1, wherein the axial recess in the first valve member has a cylindrical surface aligned with the cylindrical seat wall of the second valve seat and adapted to sealingly cooperate during opening of the valve with the radial sealing means of the second valve member.

12. A valve according to claim 11, wherein the radial sealing means are disposed proximate an end portion of the second valve member so that during opening of the valve the radial sealing means are shifted from the second valve seat into sealing contact with the cylindrical surface of the recess before the second valve member abuts the first valve member.

13. A valve according to claim 11, wherein the aligned cylindrical surfaces of the second valve seat and the recess have bevelled edges providing a smooth transition for the radial sealing means as they move between the second valve seat and the recess.

14. A valve according to claim 1, wherein the second valve member further comprises an axial drain tube sealingly guided in a bottom part of the valve housing and permanently communicating with the leak chamber.

15. A valve according to claim 14, wherein the second valve member further comprises an axial inlet channel for introducing washing liquid into the leak chamber.

16. A double-seated valve comprising: a valve housing having at least two conduits and, between the conduits, a first, annular valve seat and a second cylindrical valve seat concentric with the first seat; a first elongated valve member having first sealing means cooperating with the first valve seat and a second valve member having radial second sealing means cooperating with the second valve seat, the valve members being axially movable concentrically with the valve seats relative to each other and relative to the associated valve seat; the first valve member including a cylindrical recess facing the second valve member and the second valve member including a portion comprising said radial second sealing means adapted to sealingly enter the recess when the valve members are moved relative to each other, a leak chamber defined between the first and the second valve members, the leak chamber being sealed with respect to the conduits in both the closed and the open positions of the valve members and in open communication with an exterior of the valve; and means for substantially balancing pressure forces exerted on the valve members by pressurized fluid in the conduits.

17. A double-seated valve comprising:
- a valve housing having at least two conduits and, between the conduits, a first, annular valve seat and a second cylindrical valve seat concentric with the first seat;
- a first, elongated valve member having first sealing means cooperating with the first valve seat and a second valve member having radial second sealing means cooperating with the second valve seat, the valve members being axially movable concentrically with the valve seat relative to each other and relative to the associated valve seat;
- the first valve member including a cylindrical recess facing the second valve member and the second valve member including a portion comprising said radial second sealing means adapted to sealingly enter the recess when the valve members are moved relative to each other, a leak chamber defined between the first and the second valve members, the leak chamber being sealed with respect to the conduits in both the closed and the open positions of the valve members, the leak chamber being sealed with respect to the conduits, the valve members further defining means establishing an open communication between the leak chamber and an exterior of the valve;

whereby the valve members, in their closed positions are relatively remote from each other and movement of the second valve member in an axial direction towards the first member engages the first member and, thereafter, moves the first valve member until both members are in their open positions.

* * * * *